(12) United States Patent
Moriya

(10) Patent No.: US 11,005,874 B2
(45) Date of Patent: May 11, 2021

(54) MONITORING APPARATUS

(71) Applicant: TOYOTA JIDOSHA KABUSHIKI KAISHA, Toyota (JP)

(72) Inventor: Tomokazu Moriya, Setagaya-ku (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/656,766

(22) Filed: Oct. 18, 2019

(65) Prior Publication Data

US 2020/0186556 A1 Jun. 11, 2020

(30) Foreign Application Priority Data

Dec. 7, 2018 (JP) .............................. JP2018-230072

(51) Int. Cl.
| | | |
|---|---|---|
| *H04L 29/06* | (2006.01) | |
| *G06N 7/00* | (2006.01) | |
| *H04L 12/24* | (2006.01) | |
| *H04L 12/26* | (2006.01) | |

(52) U.S. Cl.
CPC .......... *H04L 63/1425* (2013.01); *G06N 7/00* (2013.01); *H04L 41/16* (2013.01); *H04L 43/08* (2013.01); *H04L 63/08* (2013.01); *H04L 63/1416* (2013.01); *H04L 63/20* (2013.01)

(58) Field of Classification Search
CPC ..... H04L 63/1425; H04L 41/16; H04L 43/08; H04L 63/08; H04L 63/1416; H04L 63/20; G06N 7/00

See application file for complete search history.

(56) References Cited

U.S. PATENT DOCUMENTS

| 9,083,764 | B2* | 7/2015 | Jung ................... G06F 16/9574 |
| 9,154,464 | B2* | 10/2015 | Tenny ................... H04L 9/0838 |
| 9,225,544 | B2* | 12/2015 | Mabuchi ............. H04L 12/4035 |
| 9,338,179 | B2* | 5/2016 | Wijbrans ............ H04L 63/1433 |

(Continued)

FOREIGN PATENT DOCUMENTS

| JP | 2014-146868 A | 8/2014 |
| JP | 2017-50841 A | 3/2017 |
| JP | 2017-123639 A | 7/2017 |

*Primary Examiner* — Ghodrat Jamshidi
(74) *Attorney, Agent, or Firm* — Oblon, McClelland, Maier & Neustadt, L.L.P.

(57) ABSTRACT

A monitoring apparatus includes: an acquisition unit sequentially receiving messages on a network; a first calculation unit calculating a difference between data values of two continuous messages; a second calculation unit calculating a difference between reception time points of two continuous messages; a first determination unit determining whether a received message is an abnormal message based on the difference calculated by the first calculation unit or the second calculation unit; a second determination unit determining whether a received message is a suspicious message based on the difference calculated by the first calculation unit or the second calculation unit; and a recording unit recording, when the second determination unit determines that the received message is the suspicious message, as a history, data values and reception time points of the suspicious message and a predetermined number of messages received before and after reception of the suspicious message.

8 Claims, 5 Drawing Sheets

(56) References Cited

U.S. PATENT DOCUMENTS

| | | | |
|---|---|---|---|
| 2011/0023116 A1* | 1/2011 | Chen | H04L 63/1416 |
| | | | 726/22 |
| 2011/0040870 A1* | 2/2011 | Wynn | H04L 63/062 |
| | | | 709/224 |
| 2015/0358351 A1 | 12/2015 | Otsuka et al. | |
| 2016/0381068 A1* | 12/2016 | Galula | B60R 16/0231 |
| | | | 726/23 |
| 2017/0115372 A1* | 4/2017 | Abinader, Jr. | H04L 43/0852 |
| 2017/0131936 A1* | 5/2017 | Parra | H04L 47/38 |
| 2018/0048663 A1* | 2/2018 | Yura | H04L 12/40 |
| 2018/0101851 A1* | 4/2018 | Lowenberg | G06Q 20/4016 |
| 2018/0144119 A1 | 5/2018 | Kishikawa et al. | |
| 2018/0174210 A1* | 6/2018 | Williams | G06Q 20/12 |
| 2018/0302422 A1 | 10/2018 | Kishikawa et al. | |
| 2018/0309740 A1* | 10/2018 | Brun | H04L 9/3247 |
| 2019/0219707 A1* | 7/2019 | Xu | G01S 19/246 |
| 2019/0238572 A1* | 8/2019 | Manadhata | G06F 40/284 |
| 2019/0238573 A1* | 8/2019 | Manadhata | H04L 61/3025 |

* cited by examiner

MONITORING APPARATUS

INCORPORATION BY REFERENCE

The disclosure of Japanese Patent Application No. 2018-230072 filed on Dec. 7, 2018 including the specification, drawings and abstract is incorporated herein by reference in its entirety.

BACKGROUND

1. Technical Field

The present disclosure relates to a monitoring apparatus which monitors messages flowing on a network.

2. Description of Related Art

There is conventionally known a technique of detecting unauthorized data on a network on the basis of reception cycles of data having an identical identifier, reception intervals of data having different identifiers, and relation between data of different types.

For example, Japanese Patent Application Publication No. 2014-146868 discloses a technique of determining that abnormality such as an unauthorized attack arises when reception cycles of data having an identical identifier are shorter than designed cycles in a network apparatus of periodically receiving and processing data on an in-vehicle network or the like. Japanese Patent Application Publication No. 2017-050841 discloses an unauthorized intrusion detection method in which when a time difference from reception of a reference data frame to reception of a data frame on which unauthorized intrusion is to be detected is within a predefined range, the target data frame is determined to be proper, and in the case of being out of the range, the target data frame is determined to be unauthorized. Japanese Patent Application Publication No. 2017-123639 discloses an unauthorized intrusion detection method of determining whether or not frames with a plurality of identifiers satisfy predetermined conditions using unauthorized intrusion detection rules including conditions regarding allowable relation between frames having a first identifier and frames having a second identifier, and in the case of no satisfying, detecting that an unauthorized intrusion state arises.

SUMMARY

With such conventional unauthorized intrusion detection techniques disclosed in JP 2014-146868 A, JP 2017-050841 A, and JP 2017-123639 A, although apparently abnormal data can be detected, possible suspicious data which is intruded into a network by means of an undefined attack problematically cannot be dealt with unless it is apparently abnormal data.

Therefore, an object of the present disclosure is to provide a monitoring apparatus capable of collecting information regarding data on which abnormality of intrusion into a network is suspected.

The present disclosure relates to a monitoring apparatus that monitors a message flowing on a network. The monitoring apparatus includes: an acquisition unit that sequentially receives messages on the network, and stores, in a buffer, data values and reception time points of a predetermined number of received continuous messages for each of identifiers that the messages have; a first calculation unit that refers to the buffer to calculate a difference between data values of two continuous messages having an identical identifier; a second calculation unit that refers to the buffer to calculate a difference between reception time points of two continuous messages having an identical identifier; a first determination unit that determines that a message received when the difference calculated by the first calculation unit or the second calculation unit does not satisfy a predetermined condition for determining abnormality is an abnormal message; a second determination unit that determines that a message received when the difference calculated by the first calculation unit or the second calculation unit satisfies the predetermined condition and when the difference calculated by the first calculation unit or the second calculation unit does not satisfy a condition for determination different from the predetermined condition is a suspicious message that has a possibility of abnormality; and a recording unit that sequentially receives messages sent to the network, temporarily stores data values and reception time points of the received messages for each of identifiers that the messages have up to a predetermined upper limit number of data values and reception time points, and when the second determination unit determines that the received message is the suspicious message, records, as a history, information including a data value and a reception time point of the suspicious message and data values and reception time points of a predetermined number of messages that have an identical identifier to an identifier of the suspicious message and are received before and after reception of the suspicious message.

According to the present disclosure, there can be provided a monitoring system capable of collecting information regarding data for which abnormality of intrusion into a network is suspected.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

A monitoring apparatus according to an embodiment of the present disclosure determines whether a message received from a network is an abnormal message, and determines whether or not the received message is a suspicious message which is suspected to be possibly abnormal although the received message cannot be determined to be abnormal. When it is determined that the received message is the suspicious message, a monitoring apparatus according to an embodiment records, as a history, information regarding the message relevant to the determination and messages before and after reception of the message relevant to the determination. The recorded information regarding the suspicious message can be used for grasping and/or dealing with the fact of unauthorized intrusion into the network, by means of separate analysis of that information.

EMBODIMENT

Configuration

Figure 1:
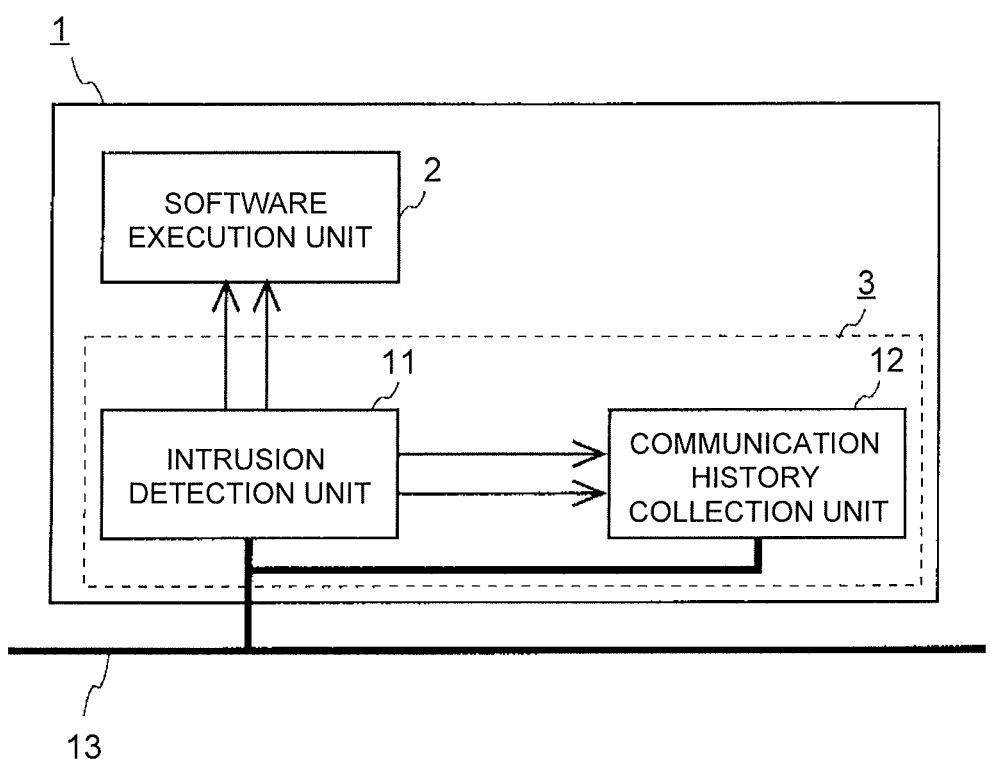
FIG. 1 is a functional block diagram of an in-vehicle apparatus including a monitoring apparatus according to an embodiment.

FIG. 1 is a functional block diagram of an in-vehicle apparatus including a monitoring apparatus according to an embodiment.

An in-vehicle apparatus 1 includes a software execution unit 2, an intrusion detection unit 11 and a communication history collection unit 12. The in-vehicle apparatus 1 is exemplarily an ECU controlling individual units of a vehicle. The software execution unit 2 executes software controlling devices to be controlled (actuators and the like) and software implementing various driving support functions, and thereby, provides a control function of the vehicle. The intrusion detection unit 11 and the communication history collection unit 12 are connected to a bus 13 of a network, and constitute a monitoring apparatus 3 which monitors messages flowing on the bus 13 and records history information as needed. A type of the network is not specially limited, a case where the network is a CAN is exemplarily described in the present embodiment. In the following description, m and n are integers (n>m).

In the exemplary configuration of the in-vehicle apparatus 1 shown in FIG. 1, the monitoring apparatus 3 is provided between the software execution unit 2 and the bus 13, and the intrusion detection unit 11 has a function of transferring messages acquired from the bus 13 to the software execution unit 2, and a function of reporting to the software execution unit 2 that an abnormal message is received. It should be noted that the monitoring apparatus 3 does not need to be provided in the in-vehicle apparatus 1 such as an ECU but may have an independent configuration. In this case, the in-vehicle apparatus having the software execution unit 2, and the monitoring apparatus 3 are connected to the bus 13 in parallel. Hereafter, details of the intrusion detection unit 11 and the communication history collection unit 12 are described.

Figure 2:
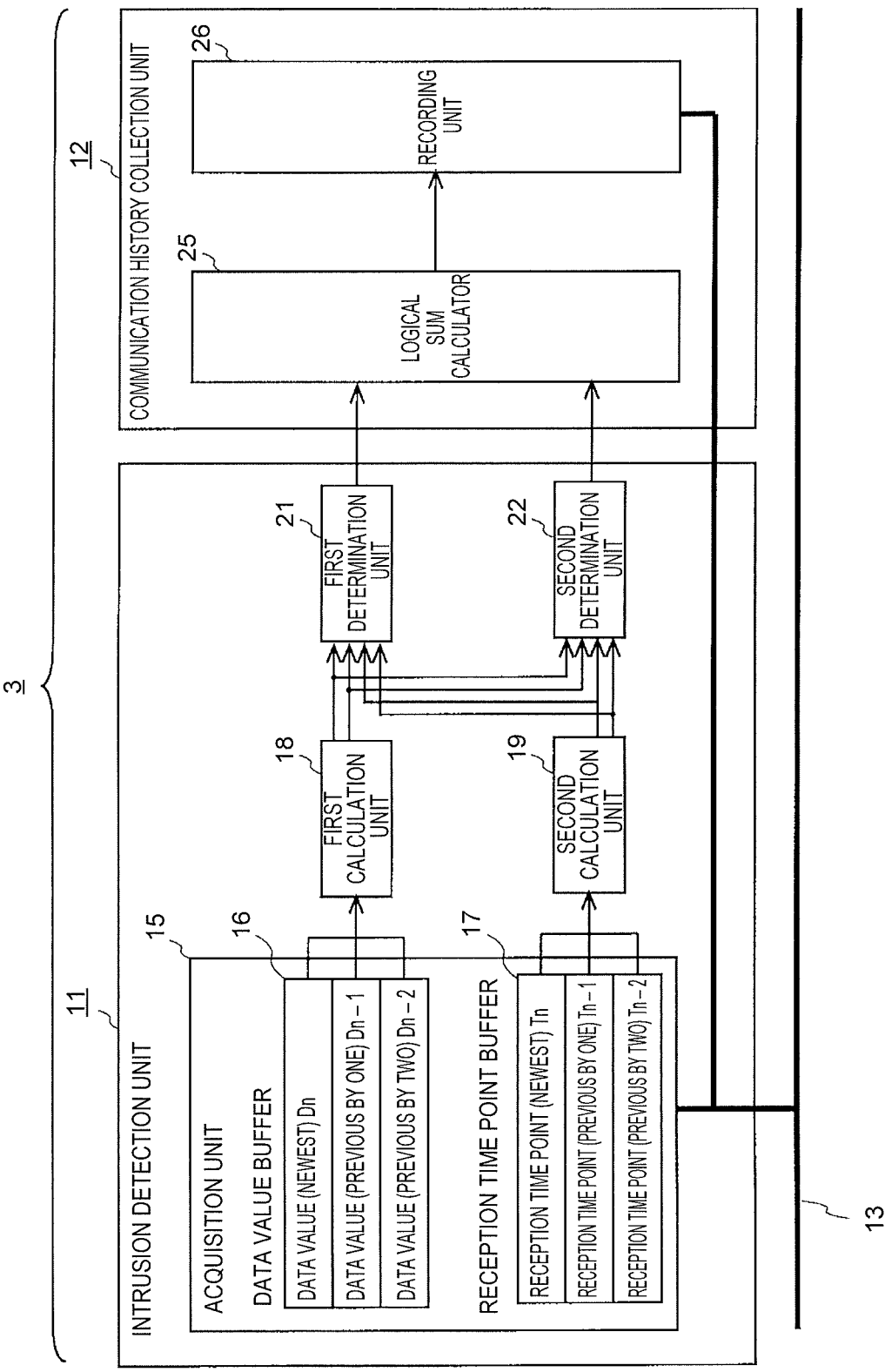
FIG. 2 is a functional block diagram showing details of the monitoring apparatus shown in FIG. 1.

FIG. 2 is a functional block diagram showing details of the monitoring apparatus shown in FIG. 1.

The intrusion detection unit 11 includes an acquisition unit 15, a first calculation unit 18, a second calculation unit 19, a first determination unit 21 and a second determination unit 22.

The acquisition unit 15 is connected to the bus 13, and sequentially receives messages which another in-vehicle apparatus sends to the bus 13. The acquisition unit 15 has a data value buffer 16 for temporarily storing data values included in the messages, and a reception time point buffer 17 for temporarily storing reception time points of the messages. The data value buffer 16 and the reception time point buffer 17 are provided for each of identifiers of messages flowing on the bus 13. Each of the data value buffer 16 and the reception time point buffer 17 has a predetermined number of data storage areas (three in the example of FIG. 2), stores data regarding a predetermined number of continuous messages that have an identical identifier in an FIFO manner. Every time when receiving a message sent to the bus 13, the acquisition unit 15 stores a data value included in the received message and a reception time point of the message in the data value buffer 16 and the reception time point buffer 17, respectively. Notably, the numbers of storage areas included in the data value buffer 16 and the reception time point buffer 17 are not limited to three but may be four or more.

The first calculation unit 18 calculates a difference between data values of two continuous messages that have an identical identifier. More in detail, every time when a new data value is stored in the data value buffer 16, the first calculation unit 18 reads a newest data value $D_n$ stored in the data value buffer 16, a second newest data value $D_{n-1}$ stored previous to the newest data value $D_n$ by one, and a third newest data value $D_{n-2}$ stored previous to the newest data value $D_n$ by two, and calculates a difference $D_n - D_{n-1}$ between the newest data value and the second newest data value, and a difference $D_{n-1} - D_{n-2}$ between the second newest data value and the third newest data value. Notably, since the value of the difference $D_{n-1} - D_{n-2}$ is identical to the difference $D_n - D_{n-1}$ calculated when the data value buffer 16 has previously stored a new data value, a process of calculating the difference $D_{n-1} - D_{n-2}$ may be skipped to use the calculated difference $D_n - D_{n-1}$ calculated when the data has been previously stored.

The second calculation unit 19 calculates a difference between reception time points of two continuous messages that have an identical identifier. More in detail, every time when a new reception time point is stored in the reception time point buffer 17, the first calculation unit 18 reads a newest reception time point $T_n$ stored in the reception time point buffer 17, a reception time point $T_{n-1}$ of a second newest message stored previous to a newest message by one, and a reception time point $T_{n-2}$ of a third newest message stored previous to the newest message by two, and calculates a difference $T_n - T_{n-1}$ between the newest reception time point and the second newest reception time point, and a difference $T_{n-1} - T_{n-2}$ between the second newest reception time point and the third newest reception time point. Notably, since the value of the difference $T_{n-1} - T_{n-2}$ is identical to the difference $T_n - T_{n-1}$ calculated when the reception time point buffer 17 has previously stored a new reception time point, a process of calculating the difference $T_{n-1} - T_{n-2}$ may be skipped to use the calculated difference $T_n - T_{n-1}$ calculated when the data has been previously stored.

The first determination unit 21 determines whether or not the received message is an abnormal message on the basis of the difference between the data values calculated by the first calculation unit 18 and the difference between the reception time points calculated by the second calculation unit 19. The first determination unit 21 uses, as conditions for determining the abnormal message, communication specifications of the network (standard) and/or system specifications of devices connected to the network. Specific examples of the communication specifications of the network and the system specifications of the devices include transmission cycles of periodically transmitted messages, transmission conditions of the messages, least transmission intervals of the messages, a range of data values included in the messages, a range of change amounts of the data values, the presence or absence of change in data values between continuous messages, and the like. These conditions are predefined for each of identifiers of messages. For example, the first determination unit 21 determines whether or not each of the difference between the data values calculated by the first calculation unit 18 and the difference between the reception time points calculated by the second calculation unit 19 satisfies the conditions of the data values and the conditions of the transmission intervals which conditions are predefined, and when any of the difference between the data values and the difference between the reception time points do/does not satisfy the predefined condition(s), determines that the received message is abnormal data. When determining that the received message is abnormal, the first determination unit 21 outputs an abnormality report indicating that the received message is abnormal to the communication history collection unit 12 mentioned later.

The second determination unit 22 determines whether or not the received message is a suspicious message on the basis of the difference between the data values calculated by the first calculation unit 18 and the difference between the reception time points calculated by the second calculation unit 19. Herein, the suspicious message is a message which has a possibility of an abnormal message since a calculated change amount (difference) between the data values or the reception time points shows a different tendency from that of a change amount (difference) between data values or reception time points of normal messages although the first determination unit 21 does not determine that the message is the abnormal message. The suspicious message cannot be determined based on the criteria of the first determination unit 21. Therefore, the second determination unit 22 determines whether or not the received message is a suspicious message on the basis of criteria generated by statistical processing and/or machine learning. For example, there is supposed a case where it is found that a normal range of differences between determination target values (data values or reception time points of messages) is not less than a and not more than b, and furthermore, that a difference between determination target values of normal messages is within a range not less than a' and not more than b' (supposing a<a'<b'<b), for example, in 98% of possibility by statistical processing of a plurality of normal messages. When the calculated difference between the determination target values is within a range not less than a and less than a' or a range more than b' and not more than b, the received message can be stated to be a message off the tendency normally shown by normal messages although the received message cannot be determined to be apparently an abnormal message. Therefore, in the present embodiment, the second determination unit 22 determines that the received message is a suspicious message when the calculated difference between the data values or the reception time points shows a different tendency from a normal tendency of normal messages even when the difference between the data values or the reception time points satisfies the conditions for determination of the first determination unit 21. When determining that the received data is suspicious, the second determination unit 22 outputs a suspiciousness report indicating that the received message is suspicious to the communication history collection unit 12 mentioned later.

The communication history collection unit 12 includes a logical sum calculator 25 and a recording unit 26.

The logical sum calculator 25 obtains a logical sum of the presence or absence of the abnormality report output from the first determination unit 21 and the presence or absence of the suspiciousness report output from the second determination unit 22, and outputs the calculation result to the recording unit 26. Specifically, when the abnormality report or the suspiciousness report is input into the logical sum calculator 25, the logical sum calculator 25 outputs a signal for instructing the recording unit 26 to record history information, and when there is no input of the abnormality report or the suspiciousness report, the logical sum calculator 25 does not output the signal for the recording unit 26.

The recording unit 26 is connected to the bus 13, and sequentially receives messages which another in-vehicle apparatus sends to the bus 13. The reception of the messages by the recording unit 26 is performed in parallel to the aforementioned reception of the messages by the acquisition unit 15. The recording unit 26 has a data memory area composed of a RAM, an EEPROM or the like, and temporarily stores, in buffers in the memory area, data sets including the data values and the reception time points of the received messages up to a predetermined upper limit number of data sets for each of identifiers of the messages. The recording unit 26 can manage the predetermined upper limit number of data sets, for example, in a ring buffer manner. The number of data sets which can be temporarily stored may be a fixed value or may be a variable value.

When receiving the signal for instruction to record history information from the logical sum calculator 25, the recording unit 26 records, in the memory area, history information including the data value and the reception time point included in the message determined to be abnormal by the first determination unit 21 or the message determined to be suspicious by the second determination unit 22 (the message determined to be abnormal or suspicious is hereinafter called a "determination target message") and the data values and the reception time points of a predetermined number of messages which have an identical identifier to that of the determination target message and are received before and after reception of the determination target message. Notably, a method of identifying the determination target message to be recorded by the recording unit 26 is not specially limited, but each of the abnormality report output by the first determination unit 21 and the suspiciousness report output by the second determination unit 22 may be allowed to include information for identifying the determination target message (for example, the identifier and the reception time point of the message), so that the recording unit 26 can acquire the information for identifying the determination target message via the logical sum calculator 25. Otherwise, since determination processing is performed by the first determination unit 21 and the second determination unit 22 every time when a message is sent to the bus 13, the message that the recording unit 26 temporarily stores in the buffer immediately before receiving the signal from the logical sum calculator 25 may be identified as the determination target message. The recording unit 26 reads data sets (including data values and reception time points) of the determination target message and messages with the identical identifier which are received before reception of the determination target message from the buffers, and records, as the history information, the data value and the reception time point of each of the read messages. Moreover, the recording unit 26 adds, to the created history information, the data value and the reception time point regarding a message received after reception of the determination target message every time when receiving a message with the identical identifier of that of the determination target message after the reception of the determination target message. The number of data sets of the data values and the reception time points recorded as the history information by the recording unit 26 is not specially limited but may be a fixed value or may by a variable value.

Moreover, for example, when a message sent from a certain driving support system to the bus 13 is determined to be abnormal or suspicious, there can be a case where, when this message having an identifier of the driving support system is analyzed, information with other identifiers, such as a message regarding a vehicle speed, is wanted to be referred to. Therefore, a table or the like in which relevant identifiers are defined for each of identifiers of messages flowing on the bus 13 may be beforehand prepared, and when the recording unit 26 starts to record the history information, data sets (data values and reception time points) of messages with one or more identifiers relevant to that of the determination target message may be recorded. In this case, the recording unit 26 is sufficient to record a predetermined number of data sets of messages that have the identifiers in association with that of the determination target message and are received before and after reception of the determination target message with the reception time point of the determination target message being as a reference.

Control Processing

Hereafter, referring to FIG. 1 to FIG. 5, control processing of the intrusion detection unit 11 and the communication history collection unit 12 is described.

Figure 3:
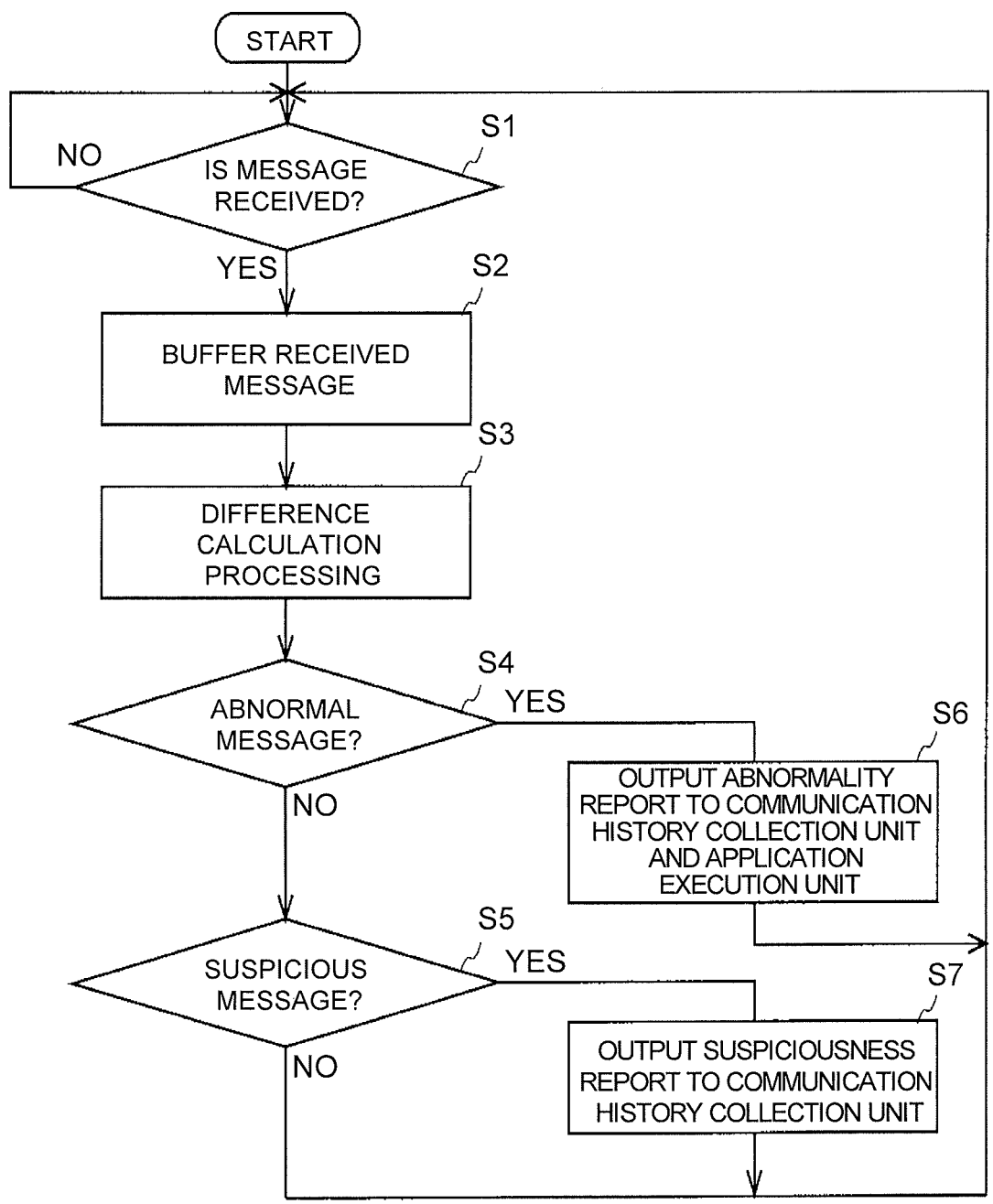
FIG. 3 is a flowchart showing control processing performed by an intrusion detection unit shown in FIG. 2.

FIG. 3 is a flowchart showing control processing performed by the intrusion detection unit shown in FIG. 2.

Step S1: The acquisition unit 15 determines whether or not a message sent to the bus 13 is received. When the determination in step S1 is YES, the process is put forward to step S2, and in the other case, the determination in step S1 is performed again.

Step S2: The acquisition unit 15 buffers the received message. Specifically, in the exemplary configuration of FIG. 2, the acquisition unit 15 moves the values in the data value storage areas newest and previous by one generation in the data value buffer 16 to the data value storage areas previous by one generation and two generations, respectively, and stores the data value of the received message in the newest data value storage area. Likewise, the acquisition unit 15 moves the values in the reception time point storage areas newest and previous by one generation in the reception time point buffer 17 to the reception time point storage areas previous by one generation and two generations, respectively, and stores the reception time point of the received message in the newest reception time point storage area. After that, the process is put forward to step S3.

Step S3: The first calculation unit 18 and the second calculation unit 19 perform difference calculation processing. As mentioned above, the first calculation unit 18 and the second calculation unit 19 respectively refer to the data value buffer 16 and the reception time point buffer 17, and respectively calculate the difference between the data values of two continuous messages having an identical identifier, and the difference between the reception time points of these messages. After that, the processing is put forward to step S4.

Step S4: The first determination unit 21 determines whether or not the received message is an abnormal message on the basis of the difference between the data values which is calculated by the first calculation unit 18 and the difference between the reception time points which is calculated by the second calculation unit 19. When the determination in step S4 is YES, the process is put forward to step S6, and in the other case, the process is put forward to step S5.

Step S5: The second determination unit 22 determines whether or not the received message is a suspicious message on the basis of the difference between the data values which is calculated by the first calculation unit 18 and the difference between the reception time points which is calculated by the second calculation unit 19. When the determination in step S5 is YES, the process is put forward to step S7, and in the other case, the process is put forward to step S1.

Step S6: The first determination unit 21 reports an abnormality report indicating that the received message is the abnormal message to the communication history collection unit 12 and the software execution unit 2. When receiving the abnormality report from the first determination unit 21, the software execution unit 2 may perform beforehand prepared processes in occurrence of an error, such as discarding the message determined to be abnormal, and alarming a user of the reception of the abnormal message. After that, the process is put to step S1.

Step S7: The second determination unit 22 reports a suspiciousness report indicating that the received message is the suspicious message to the communication history collection unit 12. After that, the process is put to step S1.

Figure 4:
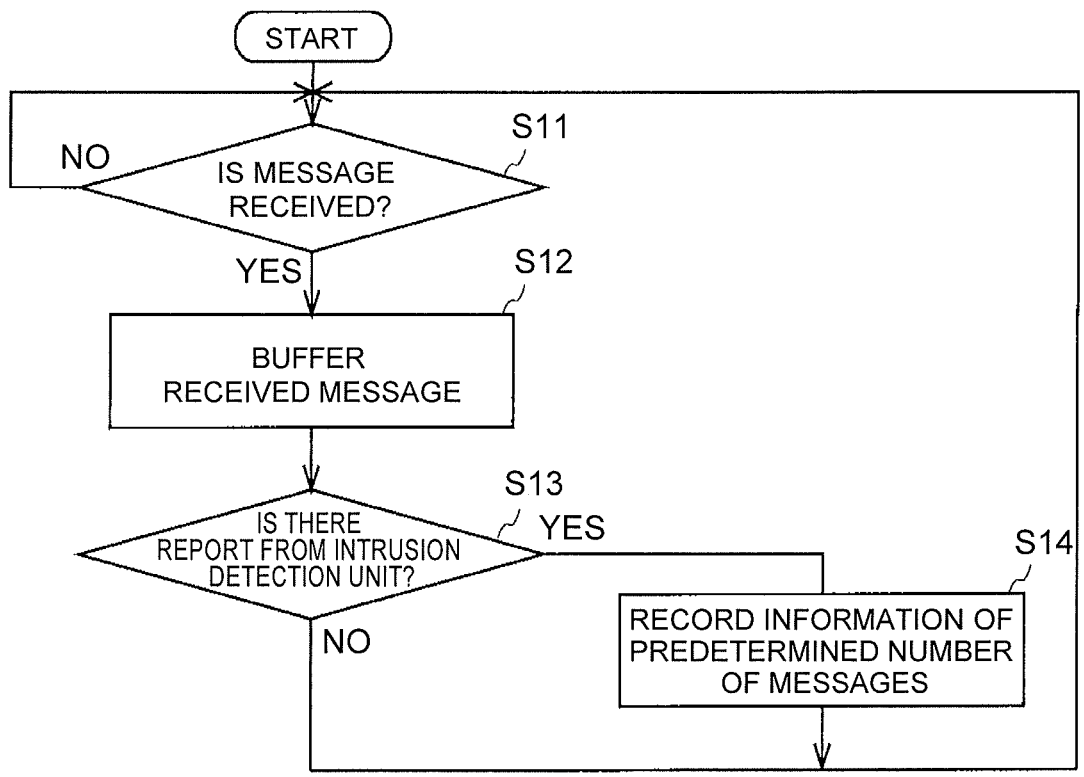
FIG. 4 is a flowchart showing control processing performed by a communication history collection unit shown in FIG. 2.
Figure 5:
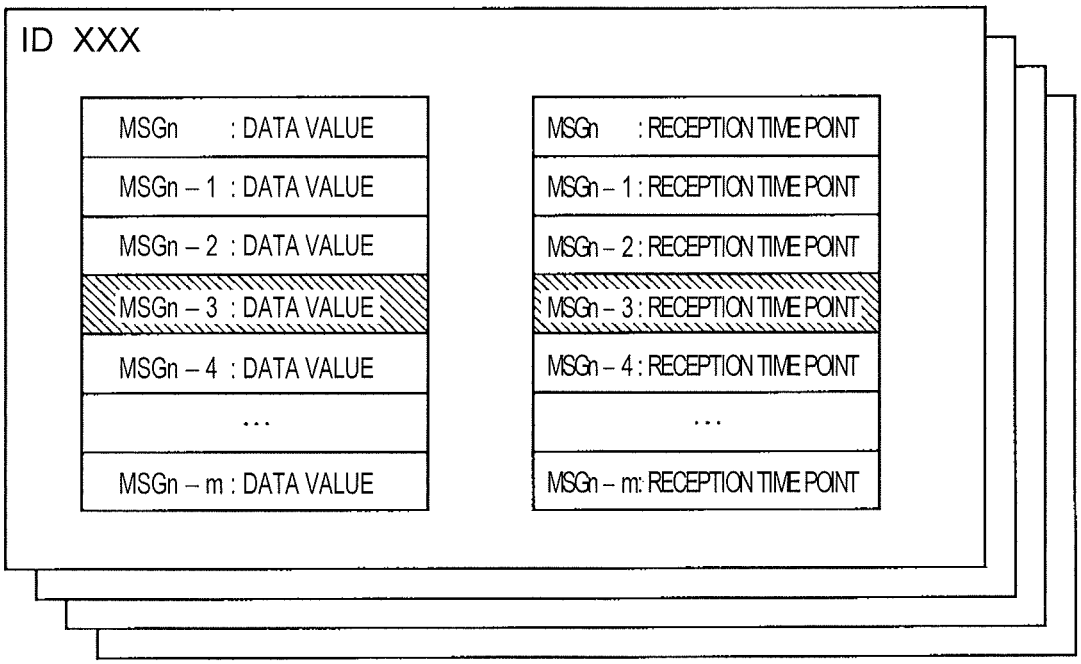
FIG. 5 is a diagram exemplarily showing history information recorded by a communication history collection unit shown in FIG. 2.

FIG. 4 is a flowchart showing control processing performed by the communication history collection unit shown in FIG. 2, and FIG. 5 is a diagram exemplarily showing history information recorded by the communication history collection unit shown in FIG. 2.

Step S11: The recording unit 26 determines whether or not a message sent to the bus 13 is received. When the determination in step S11 is YES, the process is put forward to S12, and in the other case, the determination in step S11 is performed again.

Step S12: The recording unit 26 buffers the received message. Specifically, the recording unit 26 temporarily stores, in the buffers in the memory area, data sets including data values and reception time points of messages received up to the predetermined upper limit number of data sets for each of identifiers of the messages. After that, the process is put forward to step S13.

Step S13: The recording unit 26 determines whether or not a report from the intrusion detection unit 11, that is, the abnormality report from the first determination unit 21 (see step S6 in FIG. 3) or the suspiciousness report from the second determination unit 22 (see step S7 in FIG. 3) is received, on the basis of the presence or absence of the signal output from the logical sum calculator 25. When the determination in step S13 is YES, the process is put forward to step S14, and in the other case, the process is put to step S11.

Step S14: The recording unit 26 records the data values and the reception time points of the determination target message determined to be abnormal or suspicious and the messages which have the identical identifier to that of the determination target message and are received before and after reception of the determination target message for each identifier. In the example shown in FIG. 5, when the determination target message is $MSG_{n-3}$, the recording unit 26 records, as a history of messages having an ID: XXX, the data values and the reception time points of $MSG_{n-4}$ to $MSG_n$, received before reception of the message $MSG_{n-3}$ and the data values and the reception time points of the messages $MSG_n$ to $MSG_{n-2}$ received after reception of the message $MSG_{n-3}$ as well as the data value and the reception time point of the message $MSG_{n-3}$. Notably, the history information can include information indicating that the determination target message is a message determined to be abnormal or a message determined to be suspicious. Moreover, when relevant identifiers are predefined for each of identifiers of messages, in step S14, the recording unit 26 additionally records history information regarding the identifiers relevant to the identifier of the determination target message. After that, the process is put to step S11.

Effects and Others

Figure 6:
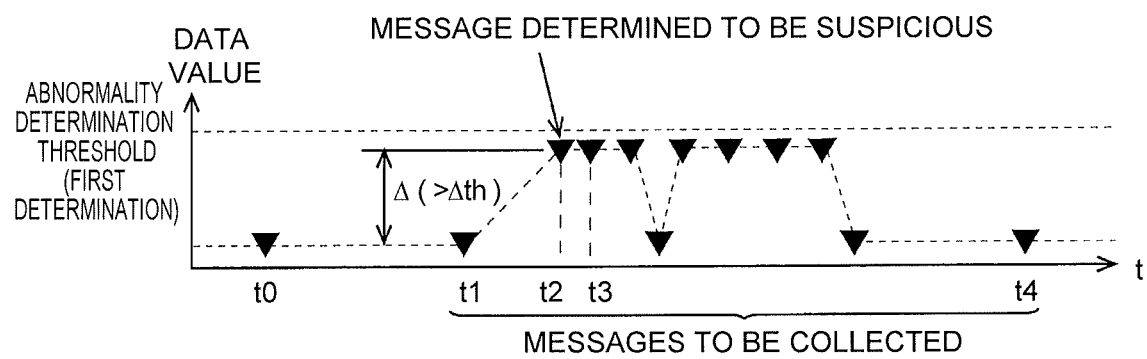
FIG. 6 is a schematic time chart for explaining operation of a monitoring apparatus according to an embodiment.

FIG. 6 is a schematic time chart for explaining operation of a monitoring apparatus according to an embodiment. In FIG. 6, the axis of abscissas denotes time, the axis of ordinates denotes a data value, and filled triangles are plots of reception time points and data values of messages with an identical identifier which are received from a bus.

In the example of FIG. 6, it is determined that a message received by the first determination unit 21 is an abnormal message when the data value of the message exceeds a predefined abnormality determination threshold. In the example shown in FIG. 6, since the data values of messages received at and after time t0 are less than the abnormality determination threshold, the first determination unit 21 does not determine that any of the messages received at and after time t0 are abnormal. It should be noted that since a difference Δ between the data values of a message received at time t2 and a message received at time t1 exceeds a threshold Δth used as a criterion by the second determination unit 22, the second determination unit 22 determines that the message received at time t2 is suspicious. Based on the determination result by the second determination unit 22, the recording unit 26 by way of example records, as a history, data values and reception time points included in the determination target message received at time t2, the message received at time t1 before time t2, and messages received at time t3 to time t4 after time t2.

The message received at time t2 is not apparently an abnormal message at the time of reception, but has both a possibility that it is a normal message and a possibility that it is a message which is sent to the bus 13 by an undefined attack technique and can cause failure to arise on a device connected to the bus 13. Notably, while in the example of FIG. 6, there is described an example of determining a suspicious message based on a change amount (difference) between data values of messages, likewise, determination processing based on a change amount (difference) between reception time points of messages can also be performed based on a criterion which the second determination unit 22 has.

As above, upon detection of a message that is possibly abnormal although not being apparently abnormal, the monitoring apparatus 3 according to the present embodiment records, as a history, information included in the detected message and messages received before and after reception of the detected message. Accordingly, by analyzing the recorded history information afterward, discovery of a new attach technique against a network and measures against the new attack technique can be taken at an early stage.

Moreover, the monitoring apparatus 3 according to the present embodiment records, as a history, information of the determination target message and messages before and after reception of the determination target message not only when the received message is determined to be a suspicious message but also when the received message is determined to be an abnormal message. Accordingly, even when an abnormal message flowing on the bus 13 of a network is detected, by analyzing the history information, situations of unauthorized intrusion into the network can be examined in detail.

Moreover, since the first determination unit 21 and the second determination unit 22 perform determination processing based on different criteria, and the second determination unit 22 uses criteria generated based on statistical processing and/or machine learning, a message which has a possibility of abnormality although not being apparently abnormal can be extracted.

Moreover, since the monitoring apparatus 3 according to the present embodiment can additionally record information of identifiers relevant to the identifier of a message determined to be abnormal or suspicious, accuracy of analysis in analyzing the history information afterward can be improved.

Notably, while such analysis of the history information recorded by the recording unit 26 may be performed in the in-vehicle apparatus 1, it may be performed on an analyzing apparatus such as an external server provided in a datacenter since analysis of history information requires high computing capacity. In this case, the monitoring apparatus 3 may transmit the history information to the external server periodically or in predetermined timing such as vehicle stop, or the monitoring apparatus 3 may transmit the history information in response to requests from the external server. Furthermore, the monitoring apparatus 3 may also transmit communication histories and diagnosis data (information for malfunction diagnosis) of a device having transmitted the determination target message and relevant devices as well as the history information to the analyzing apparatus such as the external server. By analyzing the communication histories and the diagnosis data of relevant devices as well as the history information, accuracy of the analysis can be improved.

The present disclosure can be used as a monitoring apparatus which monitors data flowing on an in-vehicle network or another network.

What is claimed is:
1. A monitoring apparatus including a processor and a memory, the monitoring apparatus monitoring a message flowing on a network and comprising:
an acquisition unit that sequentially receives messages on the network, and stores, in a buffer, data values and reception time points of a predetermined number of received continuous messages for each of identifiers that the messages have;
a first calculation unit that refers to the buffer to calculate a difference between data values of two continuous messages having an identical identifier;
a second calculation unit that refers to the buffer to calculate a difference between reception time points of two continuous messages having an identical identifier;
a first determination unit that determines that a message received when the difference calculated by the first calculation unit or the second calculation unit does not satisfy a predetermined condition for determining abnormality is an abnormal message;
a second determination unit that determines that a message received when the difference calculated by the first calculation unit or the second calculation unit satisfies the predetermined condition and when the difference calculated by the first calculation unit or the second calculation unit does not satisfy a condition for determination different from the predetermined condition is a suspicious message that has a possibility of abnormality; and
a recording unit that sequentially receives messages sent to the network, temporarily stores data values and reception time points of the received messages for each of identifiers that the messages have up to a predetermined upper limit number of data values and reception time points, and when the second determination unit determines that the received message is the suspicious message, records, as a history, information including a data value and a reception time point of the suspicious message and data values and reception time points of a predetermined number of messages that have an iden- tical identifier to an identifier of the suspicious message and are received before and after reception of the suspicious message.

2. The monitoring apparatus according to claim 1, wherein when the first determination unit determines that the received message is the abnormal message, the recording unit records, as the history, information including a data value and a reception time point of the abnormal message and data values and reception time points of a predetermined number of messages that have an identical identifier to an identifier of the abnormal message and are received before and after reception of the abnormal message.

3. The monitoring apparatus according to claim 1, wherein:
the first determination unit determines the abnormal message using, as the predetermined condition, a communication specification predefined for each of the identifiers of the messages; and
the second determination unit determines the suspicious message using the condition for determination generated by statistical processing or machine learning.

4. The monitoring apparatus according to claim 1, wherein the recording unit prestores information in which a relevant identifier is associated with each of the identifiers of the messages, and when the second determination unit determines that the received message is the suspicious message, further records, as the history, data values and reception time points of a predetermined number of messages that have the identifier relevant to the identifier of the suspicious message and are received before and after reception of the suspicious message.

5. A method for monitoring a message flowing on a network, the method comprising:
receiving sequential messages on the network and storing, in a buffer, data values and reception time points of a predetermined number of received messages for each of identifiers that the messages have;
calculating a first difference between data values stored in the buffer of two continuous messages having an identical identifier;
calculating a second difference between reception time points stored in the buffer of two continuous messages having an identical identifier;
determining that a message received when the first difference does not satisfy a predetermined condition for determining abnormality is an abnormal message;
determining that a message received when the second difference satisfies the predetermined condition and when the first difference does not satisfy a condition for determination different from the predetermined condition is a suspicious message that has a possibility of abnormality; and
receiving sequential messages sent to the network, temporarily storing data values and reception time points of the received messages for each of identifiers that the messages have up to a predetermined upper limit number of data values and reception time points, and when determining that the received message is the suspicious message, recording, as a history, information including a data value and a reception time point of the suspicious message and data values and reception time points of a predetermined number of messages that have an identical identifier to an identifier of the suspicious message and are received before and after reception of the suspicious message.

6. The method for monitoring according to claim 5, wherein when determining that the received message is the abnormal message, recording, as the history, information including a data value and a reception time point of the abnormal message and data values and reception time points of a predetermined number of messages that have an identical identifier to an identifier of the abnormal message and are received before and after reception of the abnormal message.

7. The method for monitoring according to claim 5, wherein:
determining the abnormal message includes using, as the predetermined condition, a communication specification predefined for each of the identifiers of the messages; and
determining the suspicious message includes using the condition for determination generated by statistical processing or machine learning.

8. The method for monitoring according to claim 5, wherein receiving sequential messages includes prestoring information in which a relevant identifier is associated with each of the identifiers of the messages, and when the received message is determined to be the suspicious message, further recording, as the history, data values and reception time points of a predetermined number of messages that have the identifier relevant to the identifier of the suspicious message and are received before and after reception of the suspicious message.

* * * * *